United States Patent
Guettaf

(10) Patent No.: US 7,089,471 B2
(45) Date of Patent: Aug. 8, 2006

(54) SCAN TESTING MODE CONTROL OF GATED CLOCK SIGNALS FOR FLIP-FLOPS

(75) Inventor: Amar Guettaf, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 372 days.

(21) Appl. No.: 10/640,686

(22) Filed: Aug. 14, 2003

(65) Prior Publication Data
US 2005/0039096 A1    Feb. 17, 2005

(51) Int. Cl.
*G01R 31/28* (2006.01)
(52) U.S. Cl. .................................... 714/731; 714/729
(58) Field of Classification Search ............. 714/731, 714/726, 30, 729; 703/23; 327/293; 326/38
See application file for complete search history.

(56) References Cited

U.S. PATENT DOCUMENTS

| | | | |
|---|---|---|---|
| 4,493,077 A * | 1/1985 | Agrawal et al. ............ 714/731 |
| 5,235,600 A * | 8/1993 | Edwards .................... 714/731 |
| 5,621,651 A * | 4/1997 | Swoboda .................... 703/23 |
| 5,812,562 A * | 9/1998 | Baeg ......................... 714/726 |
| 5,841,670 A * | 11/1998 | Swoboda .................... 703/23 |
| 5,859,442 A | 1/1999 | Manning |
| 6,199,182 B1 | 3/2001 | Whetsel |
| 6,378,093 B1 | 4/2002 | Whetsel |
| 6,452,435 B1 * | 9/2002 | Skergan et al. ............ 327/293 |
| 6,539,497 B1 * | 3/2003 | Swoboda et al. ............ 714/30 |
| 6,646,460 B1 | 11/2003 | Whetsel |
| 6,861,867 B1 * | 3/2005 | West et al. .................. 326/38 |

* cited by examiner

*Primary Examiner*—David Ton
(74) *Attorney, Agent, or Firm*—Sterne, Kessler, Goldstein & Fox, P.L.L.C.

(57) ABSTRACT

Circuits and a method to enhance scan testing by controlling clock pulses that are provided to flip-flops within an integrated circuit are provided. An integrated circuit is provided that includes a scan testing clock control circuit for flip-flops. The scan testing clock control circuit enables control of a clock input signal to one or more flip-flops within the integrated circuit. In one embodiment, a scan testing clock control circuit can be used to ensure that a flip-flop receives a clock input signal during scan testing. In one embodiment the scan testing clock control circuit includes a latch, and an AND gate. A method for scan testing using a scan testing clock control circuit for flip-flops is also provided.

6 Claims, 4 Drawing Sheets

SCAN TESTING MODE CONTROL OF GATED CLOCK SIGNALS FOR FLIP-FLOPS

BACKGROUND OF THE INVENTION

1. Field of the Invention

The present invention relates to integrated circuits, and more particularly, to scan testing of integrated circuits.

2. Background of Invention

Effective testing of integrated circuits significantly enhances the ability of integrated circuit developers and manufacturers to provide reliable devices. Various techniques have been employed to test integrated circuits during the manufacturing process. One such technique that is commonly known, and has been used within the industry for over twenty years is scan testing.

Scan testing provides an efficient approach to testing the structural integrity of devices, such as flip-flops, within a complex integrated circuit. Scan testing does not test integrated circuit-level functionality. Rather, test personnel use scan testing to confirm that individual flip-flops within an integrated circuit function properly. The sheer number of flip-flops within an integrated circuit, which is often greater than a million, presents a daunting challenge for testing. Scan testing addresses this challenge through the use of automated test units that provide test vectors to scan paths including thousands of flip-flops within integrated circuits that have been designed to support scan testing.

Typically, complex integrated circuits are designed and implemented as a series of interconnected functional blocks, each of which can be tested independently. Devices, such as flip-flops, within these functional blocks can be designed, such that they can be connected together in a scan path to support scan testing. Flip-flops and other elements within a scan path include, in addition to inputs and outputs used for normal operation, two inputs associated with the scan testing capability. These include a scan input (SI) and a scan enable (SE) input. Flip-flops within a scan path have their output connected to the SI input of a subsequent flip-flop. The first flip-flop within a scan path receives its input from an automated test unit through a test access port on the chip. The last flip-flop within a scan path provides its output to the automated test unit through a test access port. Many scan paths can exist within a single integrated circuit.

One challenge to providing effective scan testing is ensuring that the state of flip-flops only change during scan testing in a controlled manner. When the state of flip-flops are not controlled during testing, they can impact other flip-flops in unpredictable ways leading to output patterns that do not correspond to reference patterns. To control the state of flip-flops, clock signals input into flip-flop devices must be controlled.

Furthermore, as processor speeds have increased, regulating clock inputs to flip-flops during scan testing has become more complicated. Circuitry to control the clock input during testing must not induce timing delays during normal operation. Even slight delays on the order of picoseconds can potentially lead to erratic behavior in an integrated circuit.

What is needed are circuits and methods of control of clock signals for flip-flops to facilitate efficient scan testing without impairing the normal operation of an integrated circuit.

SUMMARY OF THE INVENTION

The present invention is directed to circuits and a method to enhance scan testing by controlling clock pulses that are provided to flip-flops within an integrated circuit. An integrated circuit is provided that includes a scan testing clock control circuit for flip-flops. The scan testing clock control circuit enables control of a clock signal that is provided to one or more flip-flops within the integrated circuit. A method for scan testing using a scan testing clock control circuit is provided in which a scan testing clock control circuit is used to ensure that clock signals reach a flip-flop while scan testing occurs.

There are several benefits associated with the invention. First, the invention can be used to ensure that flip-flops receive a clock pulse in a controlled manner during testing, thereby facilitating more predictable test results. Second, the invention does not induce timing delays that would hinder normal operation of an integrated circuit.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
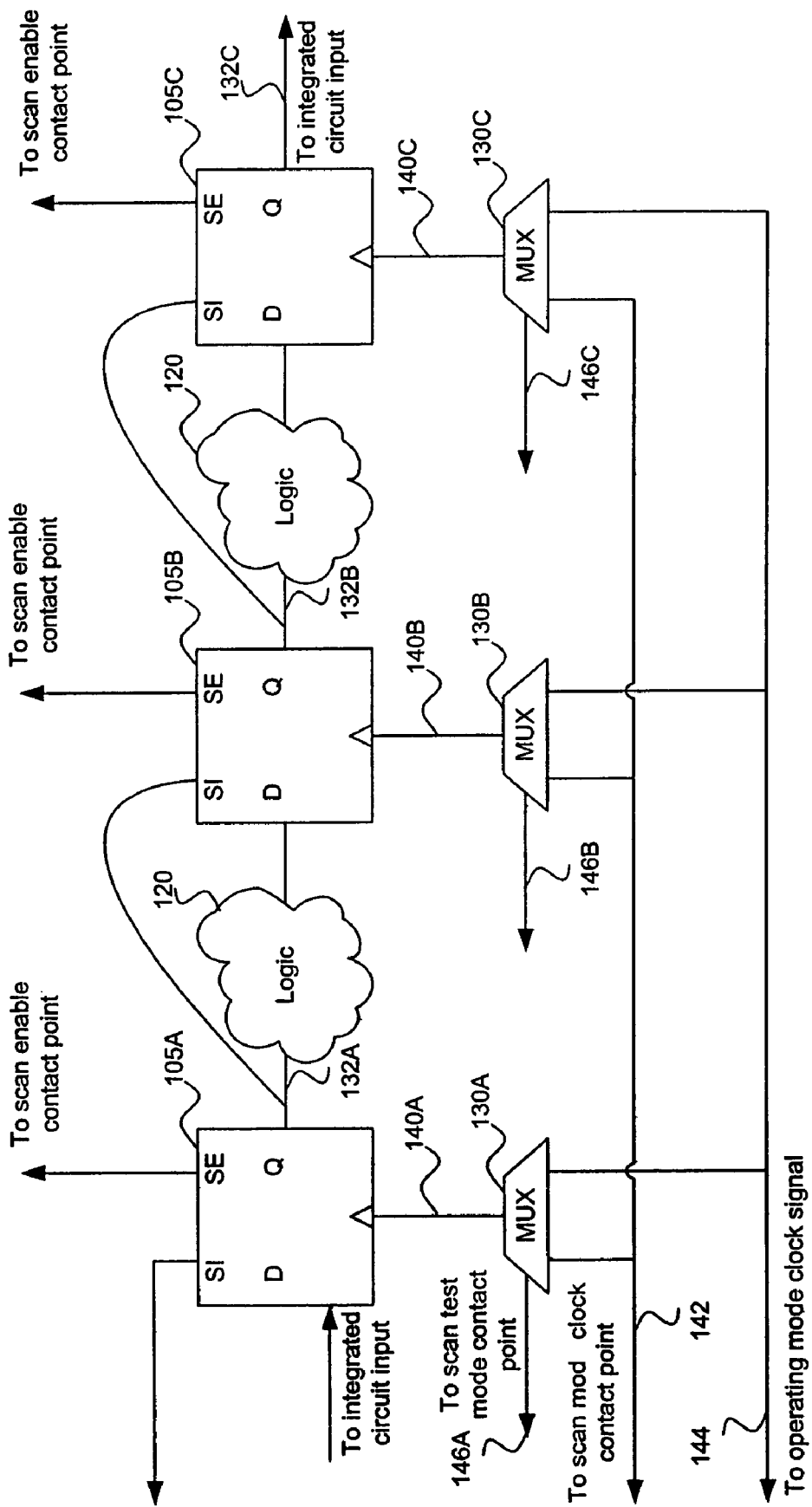
FIG. 1 is a diagram of a truncated scan path.

FIG. 1 illustrates an example of a truncated scan path within an integrated circuit. The scan path includes flip-flop 105A, flip-flop 105B, and flip-flop 105C. Flip-flop 105A represents the first flip-flop in the scan path. An SI input on flip-flop 105A is coupled to a scan input contact point. The scan input contact point provides an interface to an automated testing unit that allows test patterns to be inputted. An SE input on flip-flop 105A is coupled to a scan enable contact point.

Two modes exist within scan testing: shift mode and capture mode. In shift mode, a flip-flop will process inputs received on the SI input. The scan enable contact point provides an interface to an automated testing unit that allows the test unit to provide a signal that places a flip-flop into shift mode. In capture mode, a flip-flop will process inputs received on the D input, as would be the case in normal operating mode. In this case, a low signal is typically applied to the SE input to enter capture mode.

In general, the term contact point is used herein to refer to any electrical contact point within or on packaging that can provide electrical coupling to an integrated circuit. The packaging provides a protective layer on a semiconductor wafer used to create the integrated circuit. Methods of packaging and types of packages are well known to individuals skilled in the relevant arts.

Output 132 of each flip-flop in a scan path is coupled to an SI input of the subsequent flip-flop in a scan path. For example, output 132A of flip-flop 105A is coupled to the SI input of flip-flop 105B. The output 132B of flip-flop 105B is coupled to the SI input of flip-flop 105C. As flip-flop 105C represents the last flip-flop in the scan path, its output 132C is coupled to an output contact point that can be coupled to the automated test unit to enable the test unit to monitor the output patterns during testing. Additionally, outputs 132 from flip-flops 105 are connected to other devices (e.g., logic 120) for normal operation—non-scan test mode—supporting integrated circuit logic and operations.

Clock inputs 140 for each of flip-flops 105 are received from a multiplexer, such as multiplexers 130A, 130B and 130C. Multiplexers 130 are coupled to clock signal inputs 142 and 144. Clock signal 144 is used for normal operation. Clock signal 142 is used in scan testing mode. In addition, as discussed further below, memory and other functional components contained within logic 120 will receive a clock signal. Each of multiplexers 130A, 130B, and 130C have a control input 146 connected to a scan test mode contact point. When scan testing is to take place, an automated test unit controls multiplexers 130A, 130B, and 130C via control inputs 146 to connect the scan testing mode clock signal 142 to the flip-flop clock inputs 140.

When scan testing takes place, normal operation is suspended and each flip-flop, such as flip-flops 105, within a scan path under test can be instructed through the SE input to enter scan test shift mode. For example, a high signal may be placed on this input to enter scan test shift mode. Once the flip-flop, such as flip-flop 105, is in scan test mode, a test input signal can be inputted from a test vector to the SI input. One or more scan test clock signals, such as clock signal 142, can then be provided to the flip-flops under test to toggle the flip-flops and to clock out a scan test output. This output is compared to a reference pattern to verify correct operation. Differences between the reference pattern and output indicate some form of defect (e.g. flip-flop defects, connection between flip-flops defect, scan test defect), and the integrated circuit will be rejected, or subjected to additional tests. This procedure is typically repeated many times for different scan paths within an integrated circuit and using different test vectors, which are often referred to as a scan patterns.

As discussed above, one challenge during scan testing is to ensure that the state of flip-flops only change during scan testing in a controlled manner. To control the state of flip-flops, clock signals input into flip-flop devices must be controlled.

Figure 2:
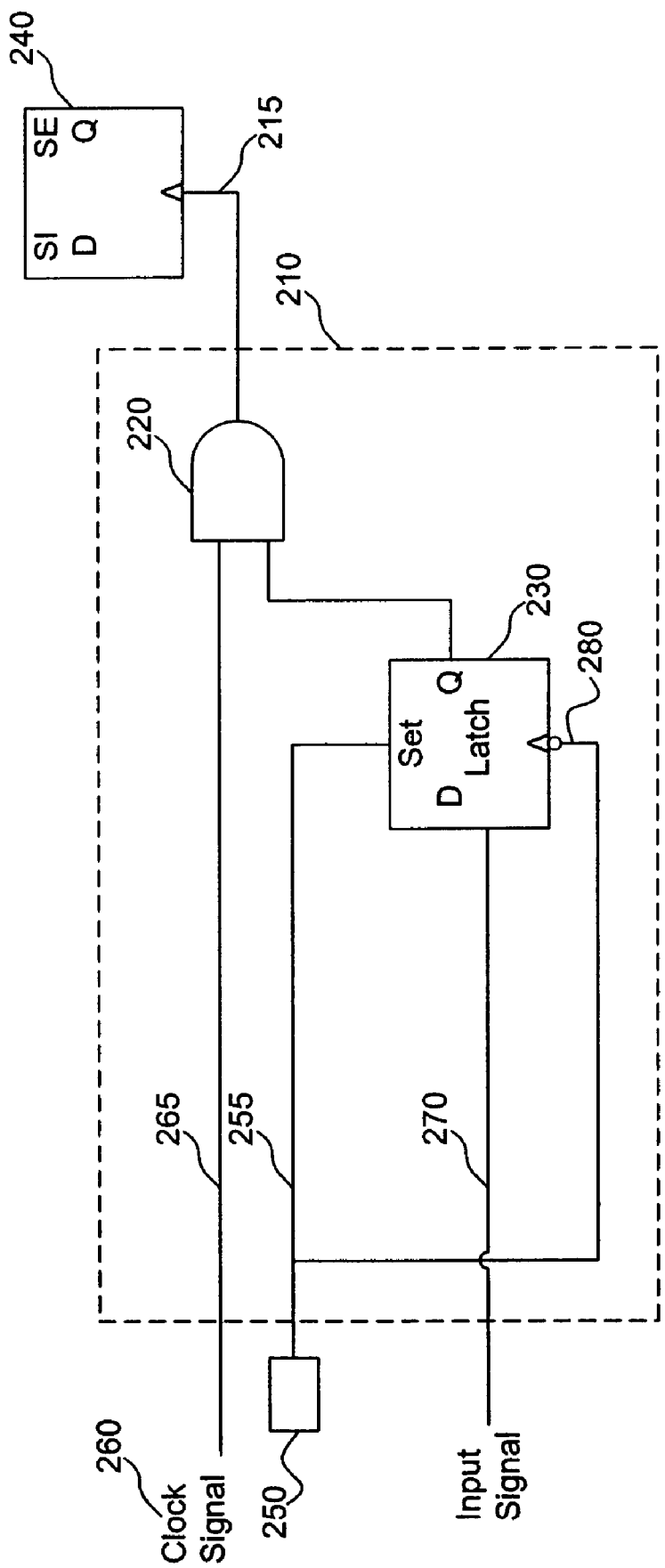
FIG. 2 is a diagram of an example scan testing clock control circuit for flip flops, according to an embodiment of the invention.

FIG. 2 provides an example diagram of a scan test clock control circuit 210 for flip-flops, according to an embodiment of the invention. Scan test clock control circuit 210 includes AND gate 220 and latch 230.

AND gate 220 has two inputs. The first input is coupled to clock signal 260 that is applied by an external clock. During normal operation clock signal 260 will be a clock signal to manage circuit timing for normal functioning of the features of the integrated circuit. During scan mode testing the clock signal will be a clock signal that supports scan testing. The second input is coupled to an output of latch 230. The output of AND gate 220 is coupled to a clock input of flip-flop 240.

Latch 230 has three inputs and one output. The inputs are SET, D, and clock input 280. The output is Q. The SET input is coupled to a scan enable input 255 that is accessed through scan enable contact point 250. The D input is coupled to input signal 270 for normal operation. This input can be coupled to a memory device, another flip-flop or other functional element within an integrated circuit. Clock signal input 280 has an inverted input, and is coupled to a clock signal input that can be used for normal operation or for scan test mode. The Q output is coupled to AND gate 220.

In one embodiment, scan test clock control circuit 210 can be incorporated into a scan path such as the one illustrated in FIG. 1. In this case, flip-flop 240 is representative of flip-flip 105. Furthermore, point 265 illustrated in FIG. 2 would be connected to the output of multiplexer 130, and point 215 illustrated in FIG. 2 would be connected to the clock input of flip-flop 105.

Scan testing clock control circuit 210 enables effective scan testing without impairing the normal operation of an integrated circuit. When not in scan testing mode, scan testing clock control circuit 210 enables flip-flop 240 to receive a normal clock signal without imposing delay that adversely impacts the operation of the integrated circuit. As will be known by individuals skilled in the relevant arts, in some circumstances a latch is used for normal operation of an integrated circuit to ensure synchronous control of flip-flops within an integrated circuit when a clocking signal is removed or applied. Moreover, a latch is commonly used with flip-flops to reduce power consumption of the integrated circuit. Flip-flops will consume less power when not receiving a clock pulse. Thus, when a flip-flop is not in use, a latch can prevent a clock input from reaching a flip-flop, thereby reducing overall power consumption for an integrated circuit. Scan testing clock control circuit 210 supports such latching functionality.

Scan testing clock control circuit 210 operates in the following manner. When scan enable input 255 on scan enable contact point 250 is set to high, the SET input of latch 230 will be high. As a result the Q output will be high, which ensures that a clock signal can propagate through AND gate 220. In this case, flip-flop 240 would receive a clock signal, if a scan testing mode clock signal was provided by clock signal 260. This configuration would be used when scan testing is occurring and the test operator does want the state of flip-flop 240 to change.

When not in scan test mode, scan testing clock control circuit 210 always permits flip-flop 240 to function normally. That is, the Q output of latch 230 will be a function of the D input. For example, when scan enable input 255 is low, the SET input of latch 230 will be low. In this case the Q output will be a function of the D input. Thus, whether a clock signal is permitted to reach flip-flop 240 will be a function of the D input. In this case, the clock input signal 260 meets with minimal delay (e.g., delay caused by AND gate 220), which does not adversely affect system timing.

Figure 3:
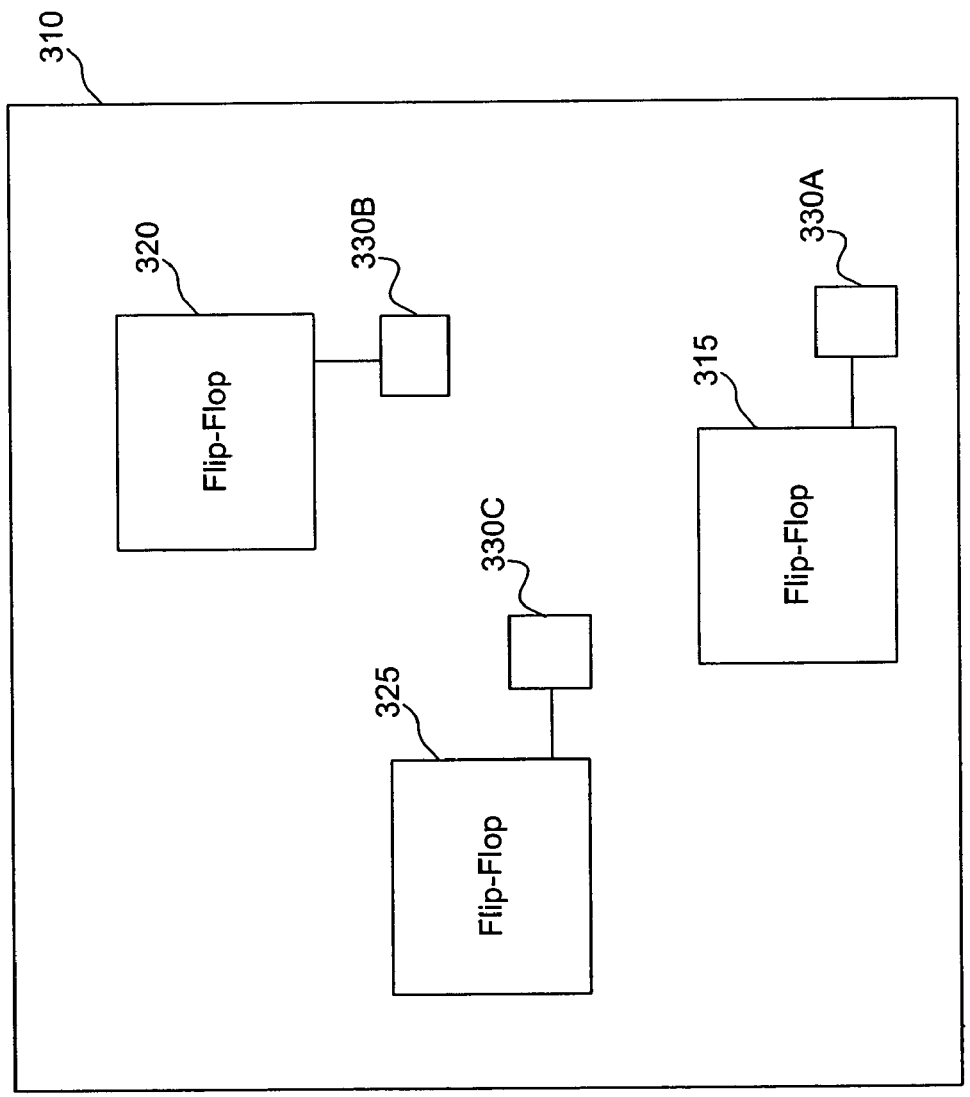
FIG. 3 is a diagram of an integrated circuit containing scan testing clock control circuits for flip flops, according to an embodiment of the invention.

The invention can be implemented for multiple flip-flops. FIG. 3 illustrates a diagram of an integrated circuit 310 containing scan testing clock control circuits for flip-flops, according to an embodiment of the invention. Integrated circuit 310 includes flip-flop 315, flip-flop 320, flip-flop 325, and scan testing clock control circuits 330A, 330B, and 330C. In the embodiment shown, each flip-flop has a corresponding scan testing clock control circuit. For example, scan testing clock control circuit 330A is coupled to flip-flop 315. Scan testing clock control circuit 330B is coupled to flip-flop 320. And, scan testing clock control circuit 330C is coupled to flip-flop 325. In alternative embodiments a single scan testing clock control circuit, can be coupled to more than one flip-flop. For example, scan testing clock control circuit 330A can be coupled to both flip-flop 315 and flip-flop 320 to control whether a clock signal is permitted to be input to these flip-flops during scan testing.

Figure 4:
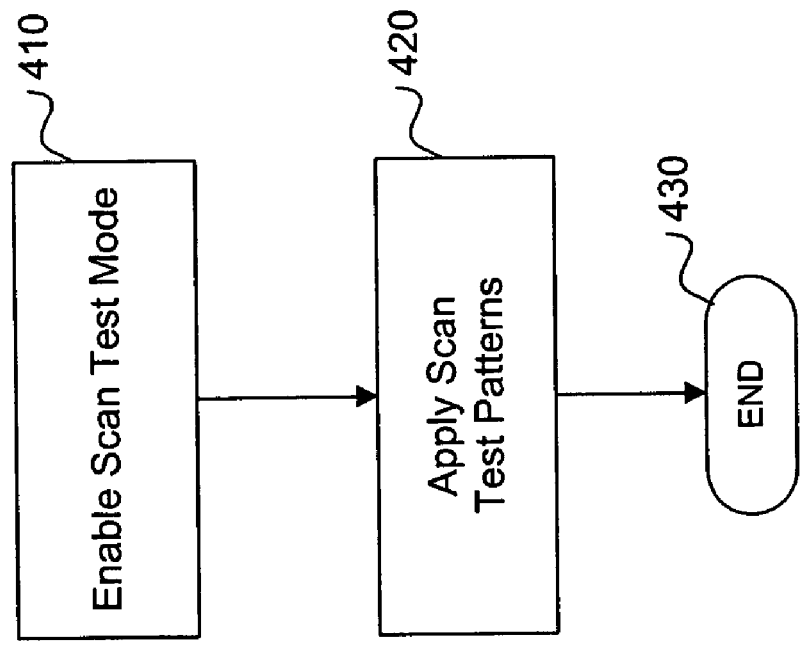
FIG. 4 is a flow chart of a scan testing method that controls when clock pulses reach a flip-flop, according to an embodiment of the invention.

FIG. 4 is a flow chart of method 400 to ensure clock impulses reach a flip-flop during scan testing, according to an embodiment of the invention. Scan testing method 400 begins in step 410. In step 410, scan test mode is enabled. For example, a high signal can be applied to a scan test mode contact point. In step 420, scan test patterns are applied. During the application of scan test patterns, when testing requires that a clock pulse be inputted into a flip-flop, such as flip-flop 240, a scan testing clock control circuit, such as scan testing clock control circuit 210 can be used. The use of scan testing clock control circuit 210 can ensure that a clock signal will reach flip-flop 240. In this case, a scan enable input signal would be used to ensure that a clock pulse reached flip-flop 240 during the appropriate times during the running of the scan test patterns. These times will vary depending on the specifics of the test patterns. In step 430 method 400 ends.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An integrated circuit having at least one flip-flop, comprising:
    a scan testing clock control circuit, wherein said scan testing clock control circuit ensures that a clock input signal reaches the at least one flip-flop during scan testing at appropriate times and permits normal operation when not in scan testing mode; and
    a scan enable contact point coupled to said scan testing control circuit to enable scan testing mode.

2. The integrated circuit of claim 1, wherein said scan testing clock control circuit comprises:
    a latch; and
    an AND gate coupled to an output of said latch.

3. The integrated circuit of claim 2, wherein said latch includes a SET input, an inverted clock input, a D input and a Q output.

4. The integrated circuit of claim 3,
    wherein said AND gate is coupled to the clock signal and to said Q output of said latch,
    wherein the SET input of said latch is coupled to said scan enable contact point,
    wherein the inverted clock input of said latch is coupled to a clock signal.

5. A method to conduct scan testing of an integrated circuit having at least one flip-flop and at least one scan testing clock control circuit, comprising the steps of:
    (a) enabling scan testing mode;
    (b) applying scan test patterns to the at least one flip-flop;
    (c) applying a scan enable input signal and a scan enable clock signal to the at least one scan testing control circuit during scan testing to ensure that a clock pulse reaches the flip-flop when a scan test pattern requires a clock pulse to reach the at least one flip-flop; and
    (d) transmitting the scan enable input signal to a scan testing control circuit.

6. The method of claim 5, step (c) further comprises:
    (i) entering scan testing shift mode;
    (ii) applying a scan testing mode clock signal to the at least one scan testing control circuit;
    (iii) transmitting the scan testing mode clock signal through the at least one scan testing clock control circuit to the at least one flip-flop.

* * * * *